June 12, 1923.
J. MALONYAY
1,458,661
POWER OPERATED PLOW OR OTHER AGRICULTURAL IMPLEMENT
Filed April 13, 1921    2 Sheets-Sheet 1
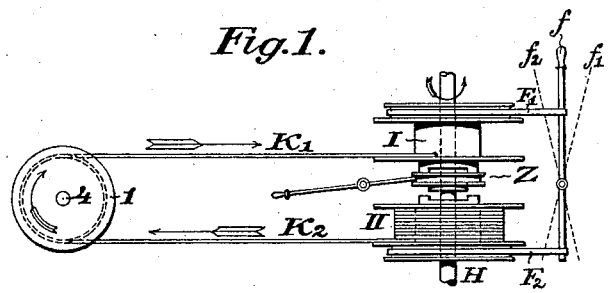
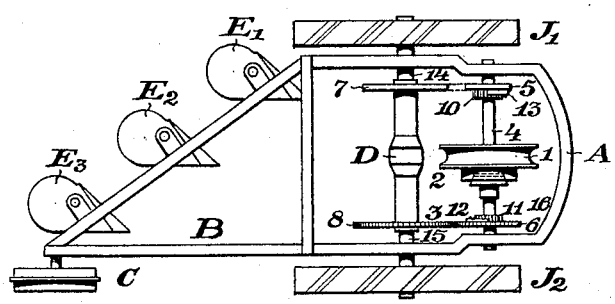

June 12, 1923.

J. MALONYAY 1,458,661

POWER OPERATED PLOW OR OTHER AGRICULTURAL IMPLEMENT

Filed April 13, 1921  2 Sheets-Sheet 2

Inventor.
Joseph Malonyay
By B. Singer, Atty

Patented June 12, 1923.

1,458,661

UNITED STATES PATENT OFFICE.

JOSEPH MALONYAY, OF DEBRECEN, HUNGARY.

POWER-OPERATED PLOW OR OTHER AGRICULTURAL IMPLEMENT.

Application filed April 13, 1921. Serial No. 461,052.

*To all whom it may concern:*

Be it known that I, JOSEPH MALONYAY, a citizen of the Kingdom of Hungary, and resident of Debrecen, in the county of Hajdu and Kingdom of Hungary, have invented certain new and useful Improvements in Power-Operated Plows or Other Agricultural Implements, of which the following is a specification.

The invention relates to power operated plows or other agricultural implements on the single machine system without anchoring devices. According to the invention the outward or idle draught and the inward or working draught are both effected by the source of power by means of a single rope, no auxiliary ropes being needed. In certain known devices, a plow or implement is drawn on the outward draught by a rope which is unwound from a winding drum on the plow and is wound on a drum of the driving machine. Both on the outward and inward draughts special auxiliary and main ropes and special drums are employed operating at different circumferential velocities. When the plow reaches the end of its idle draught a signal must be given to stop or slow down the driving machine, in order that the drum for the working draught may be coupled up. If the drum on the driving machine is not released at the right time at the end of the outward draught, the plow does not stop exactly at the end of the field, which is dangerous if the field is bordered by a ditch or a line of trees, since the ploughman cannot bring the plow to rest. At the end of the outward draught when the winding drum is being released from the running wheels, the driving machine still causes the drum to rotate for some revolutions and to wind on the rope. The drum on the plow, however, winds on in the one draught only as much rope as is wound off on the other draught and the excess quantity on the drum of the engine which is wound in the time between the stoppage of the plow and the release of the drum of the driving machine is not taken up on the drum of the plow. These lengths of rope are constantly increased in the successive draughts. Also, in these known devices the winding drum in the working draught is rotated by the running wheels which works inefficiently.

The arrangement according to the invention has, besides obviating the above drawbacks, also the advantage that the rope need have only about half the cross section of the previously used main rope, and the implement can be brought to rest independently of the driving machine by the ploughman, the machine running during both draughts at the same speed. Finally, the circumferential velocity of both drums can be the same.

In the accompanying drawing there is shown an example according to the invention.

Fig. 1 shows diagrammatically the connection of the implement with the driving machine and Fig. 2 is a plan of the implement, which is assumed to be a plow.

Fig. 1 shows the arrangement when the plow is moving outwards from the engine on the idle draught.

Figure 3:
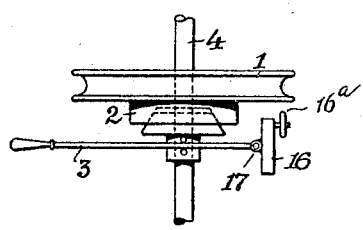
Fig. 3 is a detail plan of the clutch and its connection.

Drums I and II are loosely mounted on the machine shaft H which rotates constantly in the direction of the arrow. A coupling Z serves to connect either drum to the shaft H, the drum I being coupled up in Fig. 1. The drums I and II are provided with band brakes $F^1$ and $F^2$ which may be operated by a lever $f$. When the lever $f$ is in the middle (neutral) position, both brakes are loosely i. e. out of action. By bringing the lever $f$ in the position $f^1$ (as indicated by the dotted line in Fig. 1) the drum I will be braked, while by bringing the lever $f$ in the opposite position $f^2$ the drum II will be braked. The end $K^1$ of the rope which is fastened on this drum and passes over a pulley 1 of the plow A B is on the outward draught wound on the drum of the machine, the end $K^2$ of the rope being wound off the drum II. The pulley 1 which is mounted loosely on a shaft 4 on the frame of the plow is rotated in the direction of the arrow by the rope $K^1$, $K^2$. The rotation of the pulley 1 is transmitted to the shaft 4 by a friction coupling 2 operated by a lever 3. On the shaft 4 are mounted loosely a sprocket wheel 5 and a spur wheel 6 which can be coupled alternately to the shaft 4 by pawl and ratchet gear 10, 13 or 11, 12.

If the ratchet gear 11, 12 is coupled up the spur wheel 6 is rotated and with it a spur wheel 8, differential drive D, shafts 14, 15 and the running wheel $J^1$, $J^2$, and the plow is moved away from the machine in its idle draught, while the pawl and ratchet gear 10, 13 slides idly.

As soon as the plow has reached the limits of the field the ploughman stops the plow by releasing the friction coupling 2; the pulley 1, however, still rotating. The machinist effects the return movement of the plow by braking the drum II, which was previously rotating loosely, so that the rope is not further unwound from the drum. Since, however, the drum I is still rotating and the rope wound up, the plow is drawn towards the machine.

Figure 4:
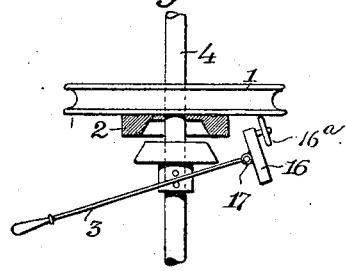
Fig. 4 is a similar view of the same, partly in section, and showing the pulley 1 released from the shaft 4.
Figure 5:
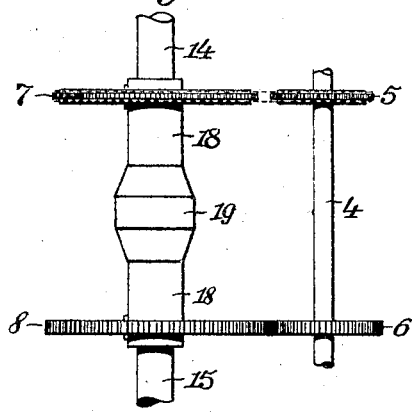
Fig. 5 is a detail plan of the shafts 4, 14 and 15 and their connection.
Figure 6:
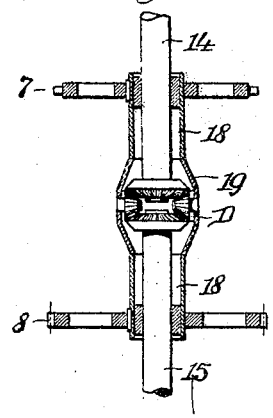
Fig. 6 is a detail elevation, partly in section, showing the shafts 14, 15, the differential, and the gears 7, 8.

Figs. 3, 4, 5 and 6 show details of the constructions shown in Figures 1 and 2, on a larger scale. Fig. 3 shows the lever 3 in the same position as in Fig. 2, when the pulley 1 is coupled to the shaft 4 by means of the friction coupling 2. Fig. 4 shows the pulley 1 coupled from the shaft 4, the pulley is loose on the shaft and may turn. The lever may be turned around the pin 17 provided on the plow-frame. When the lever 3 is in the position shown in Fig. 4, the signalling device 16 contacts with the pulley 1 by means of a small disc $16^a$ whereby the disc is rotated by frictional contact with the rotating pulley, and thus the working of the device starts. The connection between the differential drive with the shaft 4 is shown in Figs. 5 and 6. The wheels 5 and 6 engage with the wheels 7 and 8 as described above. Both wheels 7 and 8 are keyed to a sleeve 18, which is loose on the shafts 14 and 15. Both sleeves are connected through a casing 19 which is cylindrical at the center and conical at both ends. The differential drive composed of four bevel wheels is disposed within this casing. The larger bevel wheels are keyed to the ends of the shafts 14, 15, and are engaged by the smaller bevel wheels which are mounted on fixed bearings, oppositely arranged within the casing. With this arrangement the rotating wheel 7 or 8 rotates the sleeve composed of parts 18 and 19, whereby the bevel wheels which rotate on the fixed bearings secured within the casing, rotate the one or the other of the shafts 14 and 15 by means of the larger bevel wheel, according to whether the toothed or the chain wheel on the shaft 4 is rotated by this shaft.

When the plow reaches the machine, the rope, which on the outward draught was unwound from the drum II, has been rewound on the drum I.

If the plow is to be again moved outwards, the connection between the drum I and the shaft H is released by means of the coupling Z and the drum II coupled with the shaft H. The two drums I and II then interchange their functions, the direction of movement of the rope $K^1$, $K^2$ and of the pulley 1 is changed. During the first outward draught the pawl and ratchet gear 11, 12 were in action; during the next outward draught the ratchet gears 10, 13 come into action and with them the sprocket wheel 5 of which the rotation is transmitted through the sprocket wheel 7, the differential drive D and the shafts 14, 15 to the running wheels $J^1$, $J^2$.

In working draughts both ratchet gears are out of action. In idle draughts the running wheels in one direction of rotation of the pulley 1 are driven by a sprocket wheel and in the other direction by a toothed wheel; on the idle draught the running wheels are always turned in the same direction independently of the change of direction of the rope.

$E^1$, $E^2$ and $E^3$ are the ploughshares and C is the leading wheel of the plow.

Having thus described the nature of the said invention and the best means I know of carrying the same into practical effect, I claim:—

1. An agricultural machine of the class described having a pair of driving shafts each provided with a ground wheel, differential gears connecting said shafts, a countershaft, a pulley loose on the countershaft and adapted to receive power from an external source, means to lock said pulley to the countershaft at will, and power transmission connections between the countershaft and said driving shafts and each including means to compensate for variations in the speed of rotation of the driving shafts.

2. An agricultural machine of the class described having a pair of driving shafts each provided with a ground wheel, differential gears connecting said shafts, a countershaft, a pulley loose on the countershaft and adapted to receive power from an external source, means to lock said pulley to the countershaft at will, and power transmission connections between the countershaft and said driving shafts and each including a pawl and ratchet gear to compensate for variations in the speed of rotation of the driving shafts.

3. An agricultural machine of the class described having a pair of driving shafts each provided with a ground wheel, differential gears connecting said shafts, a countershaft, a pulley loose on the countershaft and adapted to receive power from an external source, a friction clutch and operating lever therefor to lock said pulley to the countershaft at will, and power transmission connections between the countershaft and said driving shafts and each including means to compensate for variations in the speed of rotation of the driving shafts.

In testimony whereof I affix my signature in presence of two witnesses.

JOSEPH MALONYAY.

Witnesses:
 DRÖRÖKTÁSZLÓ,
 VESZELY PÁL.